Nov. 3, 1942.  J. E. JOHNSON  2,300,575
SELECTIVE SUPPLEMENTAL PRINTER
Filed May 6, 1940    3 Sheets-Sheet 2
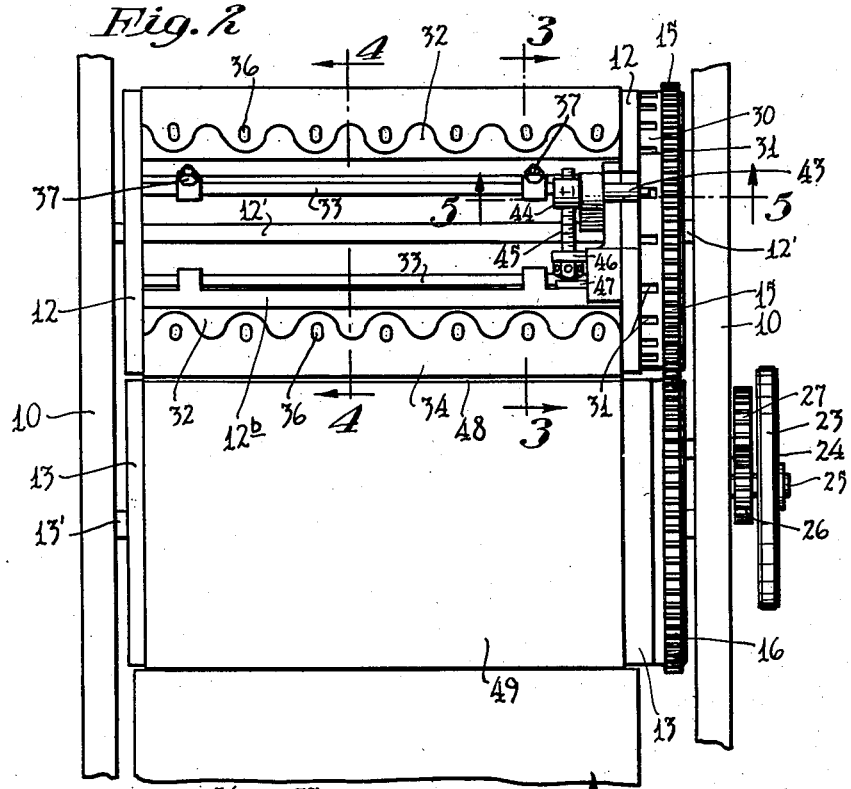
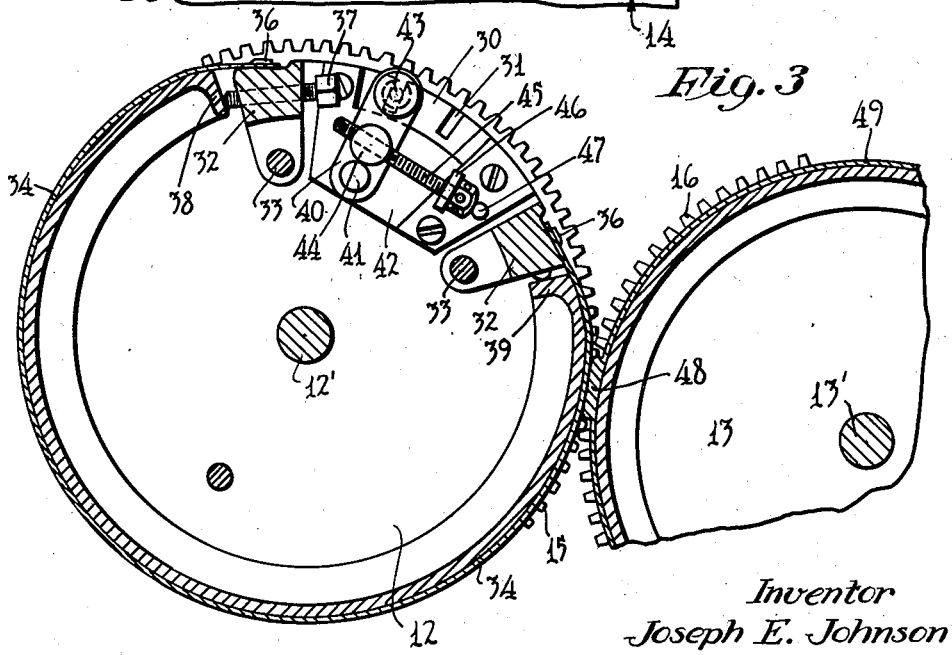
Inventor
Joseph E. Johnson
By his Attorneys Nov. 3, 1942.  J. E. JOHNSON  2,300,575
SELECTIVE SUPPLEMENTAL PRINTER
Filed May 6, 1940  3 Sheets-Sheet 3
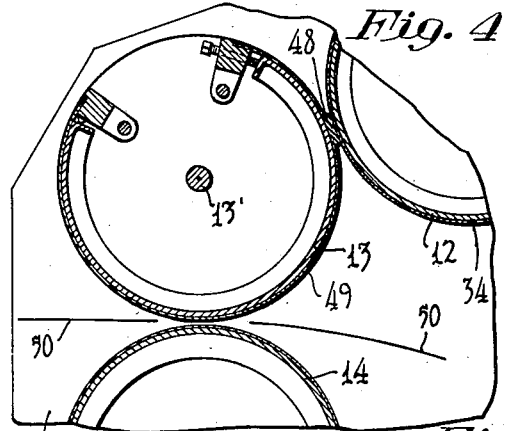
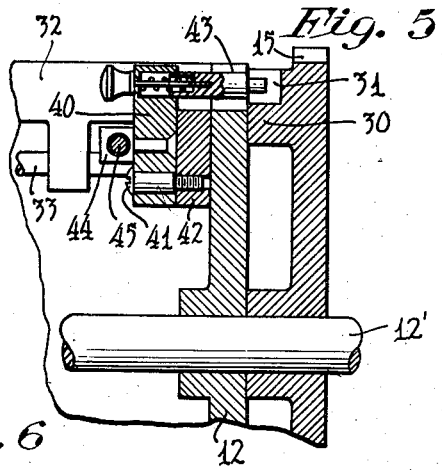
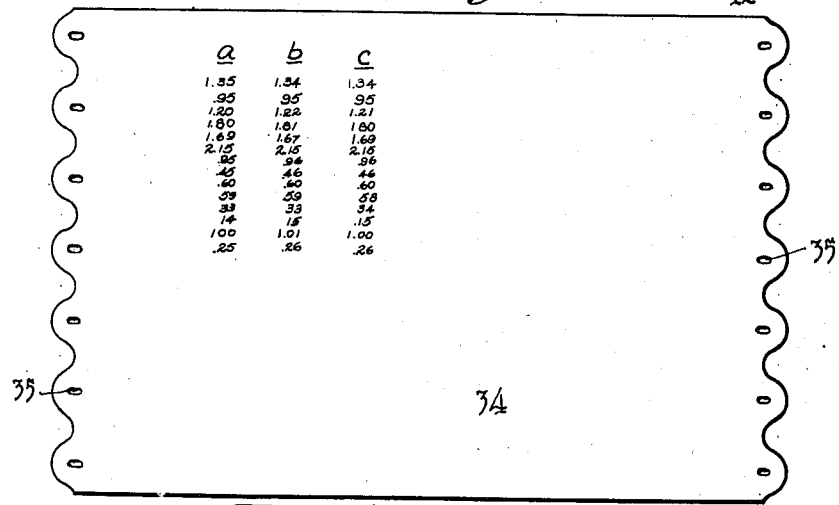
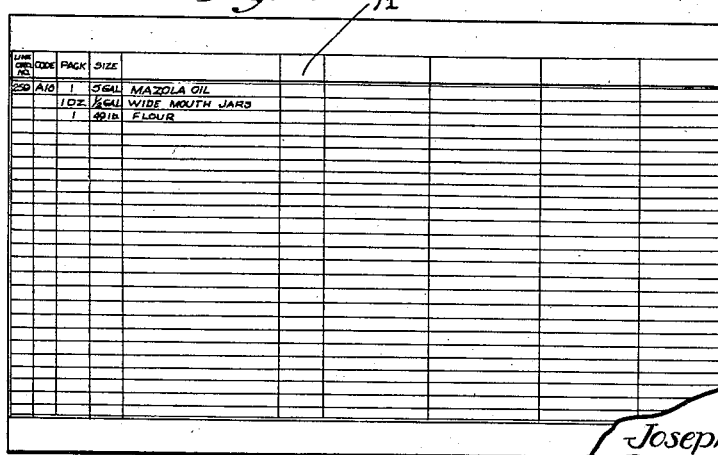
Inventor
Joseph E. Johnson
By his Attorneys Patented Nov. 3, 1942

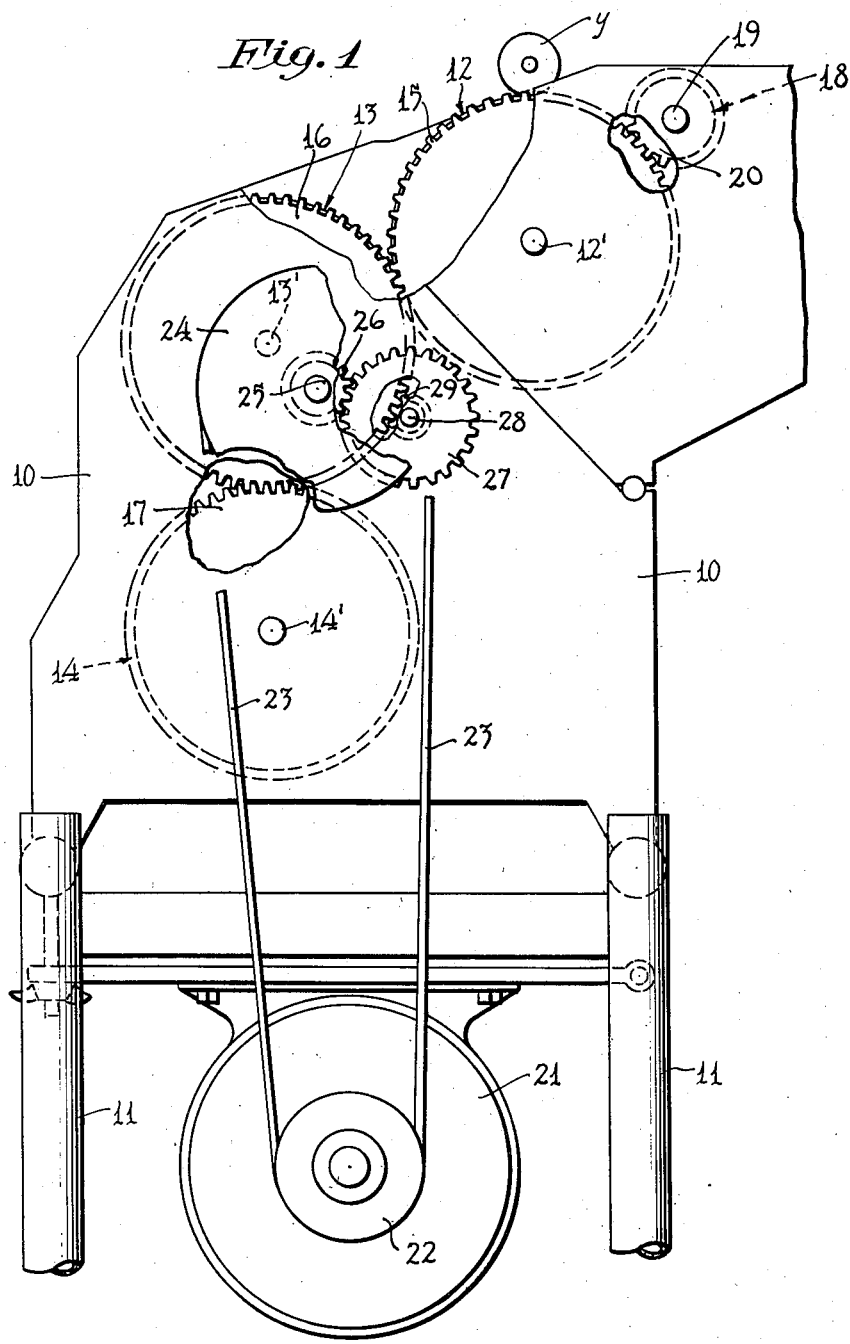

2,300,575

UNITED STATES PATENT OFFICE 2,300,575

SELECTIVE SUPPLEMENTAL PRINTER

Joseph E. Johnson, Minneapolis, Minn., assignor of one-half to Red Owl Stores, Inc., Minneapolis, Minn., a corporation of Delaware Application May 6, 1940, Serial No. 333,473

4 Claims. (Cl. 101—91)

My invention has for its object to produce and does produce an improved machine which, because of the work that it performs, may be properly designated as a selective reproducing printing machine.

It is thought that the nature of my improved machine may be generally outlined and made clear by the following statement of the specific work for which the machine was primarily and particularly designed. In the operation of business of concerns who have a number of dealers or stores located in different price towns or localities, it is the common practice to very frequently send out to all of the branches price lists or store order sheets. These sheets are in the first instance and before they are submitted to the present improved printing mechanism, printed with lists of the articles, such as groceries, for example, and other identifying data, but with blank price column spaces which will be filled in by the improved printing mechanism.

In practice, the price list for the same articles, in different localities will, because of varying freight rates and other factors, differ materially. For example, with stores in one locality may have a common price list which we can designate as price column $a$, while the stores in another locality may have a common price list which can be designated as price column $b$, and stores in still another locality may have a common price list which may be designated as price column $c$, and so on throughout the alphabet, if necessary, or according to some other designations.

In practice it will then happen that they may require, for example, twenty reproductions of price list $a$, fifteen reproductions of price list $b$, and ten reproductions of price list $c$. My improved machine is well adapted for this class of work as well as analogous work.

As an important feature of this invention, the price lists or columns $a$, $b$, and $c$, and as many more as required, will all be set up on a common printing plate, by one of the conventional methods. The advantage of the feature just noted is that a very large number of columns or sections may be set or formed on a common plate at a cost of little more than and sometimes less than the cost of otherwise producing individually the supplemental imprints to the body. In accordance with well-known lithograph printing operations, the metallic lithograph printing plates after the print has been applied thereto, are coated with a material plate etch that will not adhere to the type or image, but will adhere to the body of the metallic plate. Also, in this well-known operation the type are inked by an ink that will not adhere to the coated body of the printing plate but will adhere to the type or image surfaces. In practice, the printing plate is attached to a printing cylinder or drum and a platen-acting pressure ridge or surface is attached to a co-operating blanket drum that is of about the same diameter as the plate drum and is driven at the same speed.

The change of the printing relation between the selected price column on the printing plate and the blanket drum or printing ridge, is accomplished by rotary adjustments of the printing plate drum in respect to the other. This adjustment, in accordance with my invention, is accomplished by adjustment of the plate drum in respect to its driving gear or element; and as an additional feature when the major adjustment is made to substantially accomplish the proper alignment of the selected price column in respect to the platen or printing ridge, I provide a micrometer adjustment for accurately accomplishing the final hairline adjustment.

The above, and other novel features, will appear in the description of the commercial form of the machine illustrated in the accompanying drawings wherein like characters indicate like parts throughout the several views.

Referring to the drawings:

Fig. 1 is a side elevation of the machine with some parts broken away;

Fig. 2 is a view nearly in plan, but looking obliquely downward in a direction from the left toward the right in respect to Fig. 1;

Fig. 3 is a section taken on the line 3—3 of Fig. 2;

Fig. 4 is a section taken on the line 4—4 of Fig. 2;

Fig. 5 is a fragmentary section taken on the line 5—5 of Fig. 2;

Fig. 6 is a plan view of the printing sheet or plate showing the same flattened out and showing price list columns $a$, $b$, and $c$ referred to above, numerous other possible columns being omitted; and Fig. 7 is a plan view of a store order price sheet showing only a few of the items originally printed thereon but with a blank column for printing in of the selected price list column $a$, for example.

The frame of the machine is indicated as an entirety by the numeral 10 and is shown as provided with supporting legs 11.

It may here be stated that in this specification the cylinder or drum that carries the printing plate is designated as the primary printing plate drum; that the drum that carries the blanket or pressure ridge is designated as the secondary blanket drum or cylinder; and that the drum or cylinder that holds the paper which finally receives the print is designated as the final platen cylinder or impression drum.

In the drawings the primary plate drum is indicated by the numeral 12; the secondary or blanket drum or cylinder is indicated by the numeral 13; and the final platen drum or cylinder is indicated by the numeral 14. The drums 12, 13 and 14 are carried by shafts 12', 13' and 14', all journaled in the sides of the frame 10. The said drums 12, 13 and 14 are of about the same diameter and are respectively provided with gears 15, 16 and 17 of the same pitch diameter and are intermeshed so that the three drums noted will revolve at the same speed. The inking roller 18, indicated only by dotted lines in Fig. 1, is carried by a shaft 19 journaled in the sides of the frame 10 and is provided with a gear 20 that meshes with the gear 15.

The frame 10 is of a commercial type in which the two sections thereof are pivotally connected at x; but this feature not being a part of the present invention is not found illustrated.

In this particular machine, the power for driving the rollers is an electric motor 21 secured on the framework of the machine and the rotor shaft of which carries a driving pulley 22. A belt 23 runs over the driving pulley 22 and over a pulley 24 carried by a stub shaft 25 journaled in one side of the framework and a spur pinion 26 that meshes with a larger gear 27 carried by shaft 28 journaled in the side of the said frame and provided with a small speed-reducing pinion 29 that meshes with the gear 16 of the drum 13.

On its inner face the gear 15 of drum 12 carries an annular flange 30 formed with circumferentially spaced notches 31.

The drum 12 is not directly secured to its driving gear 15 but is made circumferentially adjustable by a novel device that will now be described.

The drum 12 is a hollow shell or cylinder which, as best shown in Figs. 2 and 3, is formed with a large segmental opening 12b that extends from end to end thereof. Within the opening 12b the drum is provided with anchoring bars 32 having inwardly projecting lugs pivoted to the heads of the drum by rods or shafts 33, which hold the plates 34.

In Fig. 6 the printing plate is indicated by the numeral 34 and at its ends it is shown as provided with perforations 35 that adapt it to be anchored over hook-like projections or lugs 36 on the outer faces of the bars 32. This sheet is shown as provided with price list columns a, b, and c above referred to and, in practice, will usually be provided with a greater number of such printing columns. The conventional method is to use one plate for each column of prices or imprint section.

One of the anchoring bars 32 is provided with one or more set-screws 37 that is engageable with a shoulder 38 to tightly draw the printing sheet onto the outer surface of the primary plate drum 12. When thus put under tension the other anchoring bar 32 will be drawn against a shoulder 39 formed on said drum, as best shown in Fig. 3.

To anchor the drum 12 and its printing sheet or plate 34 to its gear 15 in different desired circumferential adjustments, and with a final micrometer adjustment, an arm or lever 40 is pivoted at 41 to a plate 42 secured to one head of the drum 12. This arm 40, at its free end, is provided with a retractable spring-pressed lock pin 43, the end of which is normally engaged with one of the notches 31 of the flange 30 of gear 15. At its intermediate portion arm 40 is provided with a pivoted nut block 44 that is engaged by a micrometer screw 45, the head of which is swivelled between a lug 46 and a stop pin or projection 47 on the plate 42, see particularly Figs. 3 and 5. The device for shifting the printing plate drum 12 a predetermined distance in relation to the impression cylinder 14 with an auxiliary shifting micrometer adjustment is important and thought to be novel. This micrometer adjustment is also a great help in shifting the plate for hairline registration which is important in color process, multicolor, and wherever a close register is necessary.

The ink will be delivered onto the type or image of the printing sheet or plate by inking roller 18 and which roller 18, in practice, will usually be fed from another ink distributing roller, not shown. The conventional dampening roller y shown diagrammatically in Fig. 1 completes the inking operation. The properly aligned column of type a, b or c, as the case may be, is pressed against the transfer bar or ridge 48 preferably of quite soft rubber and of little greater width than one of the said columns a, b or c. Preferably, this transfer bar or ridge is formed on a flexible blanket 49 that is secured on the periphery of drum 13 and held against circumferential movements by suitable means such, for example, as that employed to anchor the printing plate 34 to the drum 12 as previously explained under paragraph 2-3.

In Fig. 4, the store price sheet as it is being fed through the machine is diagrammatically indicated by a single line 50. The space between the cylinders or drums 13 and 14, as shown, is so slight that their cylindrical surfaces, as well as the transfer bar 48, cooperate to feed sheets such as at 50, therebetween while additionally transferring the inked impression to a predetermined portion of a sheet fed thereby.

In Fig. 7, the numeral 50 indicates the store order price list sheet with certain primarily printed matter thereon but with a blank column 51, in the spaces of which the column a, b or c, or other selected column, will be printed by my improved machine.

Operation

The operation of the machine above described is probably quite obvious from the foregoing but may be summarized as follows:

The sheets 50, above generally called the store order price list sheets printed as indicated in Fig. 7 but with the blank columns 51 for the printing in of the price columns, will be fed between the secondary drum 13 and the impression drum 14 by the customary or any suitable means.

The drums 12 and 13 will be circumferentially relatively adjusted so that the transfer platen bar 48 of drum 13 will come into timed engagement with the selected price printing column a, b or c, and it will, in this instance, be assumed that it is set for engagement with column a of Fig. 6. Under rotation of the drum 12, the character columns on the printing plate 34 will be inked by rollers 20. When the selected price list column comes in contact with the transfer bar 48 of secondary drum 13, the inked characters of the selected column will be transferred on to the said transfer bar and will be transferred into the proper selected column 51 of sheets 50. In this way by the successive and proper selected adjustments of the primary drum in respect to its gear 15, the desired number of final sheets may be printed first, for example, with the characters of column *a*; then the desired number of sheets may be printed with price column *b*; then with the price column *c* and so on through all of the provided price list columns of the printing plate, into the same column of each sheet.

As a sort of repetition of statements already made, it may be again stated that the approximate proper adjustment of the primary drum and its printing plate may be quickly made by the lock pin 43 in the selected notch 31 of flange 30 carried by wheel 15; and then the final and very accurate adjustment may be made by the micrometer screw 45.

What I claim is:

1. In a machine of the kind described, a primary or printing drum, a secondary or transfer drum, and a third or impression drum, said drums being geared to rotate in cooperative relation, said primary drum having a series of circumferentially spaced axial rows of printing characters, said secondary drum, on its periphery, having an axially extending platen-acting transfer bar timed to engage a predetermined one of the rows of characters of said primary drum and to receive characters therefrom and carry the received imprint and transfer the same onto a sheet fed horizontally between said secondary drum and said third or impression drum, said transfer bar in width corresponding to the line spacing of the rows of printing characters on said primary drum, and means for circumferentially changing the relation between the rows of printing characters on said primary drum and the transfer bar on said secondary drum.

2. In a machine of the kind described, a primary or printing drum, a secondary or transfer drum, and a third or impression drum, said drums being geared to rotate in cooperative relation, said primary drum having detachably applied to its periphery a printing plate with an axial series of rows of printing characters thereon, said secondary drum, on its periphery having a blanket formed with a platen-acting transfer bar positioned and timed to engage a predetermined one of the rows of characters of said printing plate and to receive characters therefrom and carry the received imprint and transfer the same onto a sheet fed horizontally between said secondary drum and said third or impression drum, said transfer bar in width corresponding to the line spacing of the rows of printing characters on said primary drum, and means for circumferentially changing the relation between the rows of printing characters on said primary drum and the transfer bar on said secondary drum.

3. In a machine of the kind described, a drum and a power-driven disc-like wheel mounted to rotate on a common axis, said wheel having circumferentially spaced line selecting notches, a primary lock device carried by said drum and engageable with said notches, to effect predetermined selective step by step adjustments, and a secondary adjusting screw anchored to said drum and operative on said primary lock device, with a micrometer action to correct or vary the adjustments effected by said primary lock.

4. The structure defined in claim 3 in which said primary lock includes an arm pivoted to said drum and equipped at its free end with a lock pin, and in which said secondary lock device is a screw anchored to said drum and operative on said arm to effect said micrometer final adjustment.

JOSEPH E. JOHNSON.